United States Patent
Douzono et al.

(10) Patent No.: US 6,764,191 B2
(45) Date of Patent: Jul. 20, 2004

(54) ILLUMINATION TYPE KEYBOARD

(75) Inventors: Shigetaka Douzono, Fukui (JP); Takefumi Inoue, Fukui (JP); Tetsuya Koma, Fukui (JP); Yoshiharu Abe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/159,385

(22) Filed: May 31, 2002

(65) Prior Publication Data

US 2002/0196618 A1 Dec. 26, 2002

(30) Foreign Application Priority Data

Jun. 5, 2001 (JP) .................................. 2001-169223

(51) Int. Cl.[7] ............................................... F21V 9/16
(52) U.S. Cl. .......................................... 362/84; 362/85
(58) Field of Search .......................... 362/84, 85, 109, 362/88, 29; 200/314, 315; 364/84, 85, 109, 88, 29

(56) References Cited

U.S. PATENT DOCUMENTS

| 4,689,534 A | * | 8/1987 | Gerber et al. ............. 388/809 |
| 5,065,357 A | * | 11/1991 | Shiraishi et al. ............. 345/102 |
| 6,179,432 B1 | * | 1/2001 | Zhang et al. ................. 362/84 |
| 6,199,996 B1 | * | 3/2001 | Katrinecz et al. ............. 362/85 |
| 6,322,229 B1 | * | 11/2001 | Chan et al. ................... 362/85 |
| 6,467,924 B2 | * | 10/2002 | Shipman ...................... 362/31 |
| 2002/0163797 A1 | * | 11/2002 | Naghi et al. ................. 362/84 |

FOREIGN PATENT DOCUMENTS

JP 57212507 A * 12/1982 ........... G05B/23/02

* cited by examiner

*Primary Examiner*—Thomas M. Sember
*Assistant Examiner*—Hargobind S. Sawhney
(74) *Attorney, Agent, or Firm*—RatnerPrestia

(57) ABSTRACT

An EL element includes plural light-emitting regions for illuminating corresponding push buttons, and is disposed beneath the push buttons. The EL element is connected to a switching contact and a controller. An light-emitting operation of the EL element is controlled by the controller to illuminate a certain push button. The keyboard including the above components can provide multiple functions for illuminating the push buttons although having a simple structure.

14 Claims, 6 Drawing Sheets

# US 6,764,191 B2

ILLUMINATION TYPE KEYBOARD

FIELD OF THE INVENTION

The present invention relates to an illumination type keyboard used as an input device in an electronic apparatus such as a personal computer or a word processor.

BACKGROUND OF THE INVENTION

As personal computers and word processors have widely spread throughout the markets, keyboards, as their input devices, are desired to have multiple functions. For example, keyboards are demanded where characters, symbols, or pictures on buttons as well as other controls are illuminated for explicitly identifying the key functions under a dim ambient condition.

A conventional illumination type keyboard will be explained referring to FIG. 6.

FIG. 6 is a cross sectional view of the conventional illumination type keyboard. A push-button 1 made of dark color insulating resin has a display head 1A provided at the top thereof in semi-transparent or milky color and arranged of a character, symbol, or picture shape. A switching contact 2 below the push button 1 includes a circuit board 3, a flexible insulating film 4, and an insulating spacer 5 coated at both sides with an adhesive for bonding the board 3 and the film 4. The circuit board 3 has a fixed contact 3A on the upper side thereof as being spaced by a distance from a movable contact 4A provided on the lower side of the insulating film 4, thus functioning as a membrane switch.

An electro-luminescence (EL) element 6 is provided beneath the push button 1. A substrate 7 of light-transmissible material having a film form has a light-transmissible electrode layer 8 of, e.g., indium tin oxide on the lower side thereof by sputtering or electron beam method. The subsstrate 7 has an aperture 7A provided therein for accepting downwardly-extending pressing portion 1B of the push button 1.

On the upper side of the light-transmissible electrode layer 8, a light-emitting layer 9 made of synthetic resin with light emitting material dispersed therein such as zinc sulfide, a dielectric layer 10 made of synthetic resin with barium titanate dispersed therein, and a back electrode layer 11 made of silver or carbon resin are formed by printing. Those layers are covered with an insulating layer 12 of epoxy resin or polyester resin.

The switching contact 2 and the EL element 6 are protected with a case 13 of insulating resin having an opening provided in the upper side thereof through which the push button 1 extends outwardly for upward and downward movement.

When the push button 1 is pressed down, the pressing portion 1B urges from upper and deflects the insulating film 4 to make a direct contact between the movable contact 4A and the fixed contact 3A on the circuit board 3 for implementing an electrical switching operation.

When the EL element 6 is energized with a voltage between the light-transmissible electrode layer 8 and the back electrode layer 11, the light emitting layer 9 emits light which illuminates the push button 1 from its back. This allows an operator to clearly view the position of the push button 1 and the character of the display head 1A even in a dim condition.

In this manner, the conventional illumination type keyboard allows the push button 1 to be easily identified by the light emitting operation of the EL element 6. However, extra light emitting devices, illumination panels, and other components are necessary in the conventional keyboard when the push button 1 is illuminated individually or in a group to identify their particular functions and operations. This makes the keyboard include a more number of components and will be made complex in its arrangement and make it expensive.

SUMMARY OF THE INVENTION

A keyboard includes plural push buttons, plural switching contacts actuated by the push buttons, respectively, for making electrical connection and disconnection, an electronic-luminescence (EL) element provided in a direction to the switching contact about the push buttons, the EL element including separate light-emitting regions for illuminating the push buttons, respectively, and a controller coupled to the EL element and the switching contacts, for controlling an light emitting operation of the EL element to illuminate a certain push button of the push buttons.

The keyboard can thus provide multiple functions for illuminating the push buttons although having a simple structure.

DETAILED DESCRIPTION OF THE PREFERRED EMBODIMENTS

Exemplary embodiments of the present invention will be described referring to FIGS. 1 to 4. Like components are denoted by like numerals as those of the prior art and will be explained in no more detail.

Embodiment 1

Figure 1:
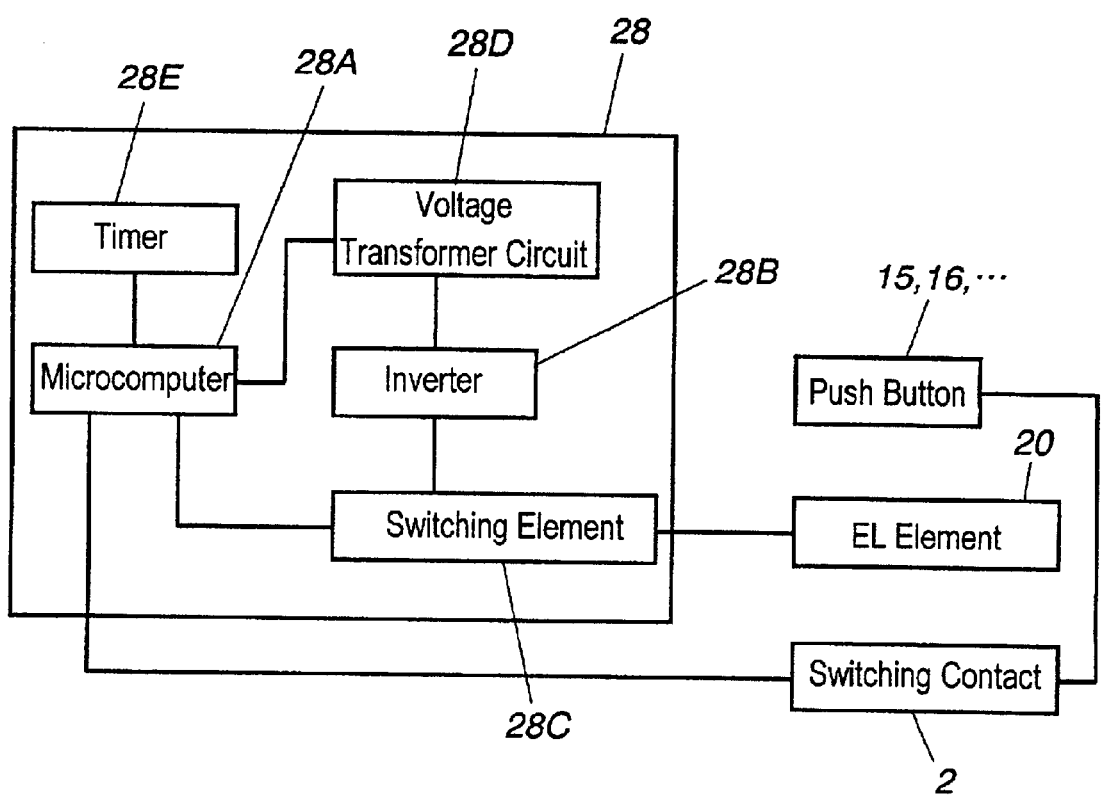
FIG. 1 is a block diagram of an illumination type keyboard according to a first embodiment of the present invention.
Figure 2:
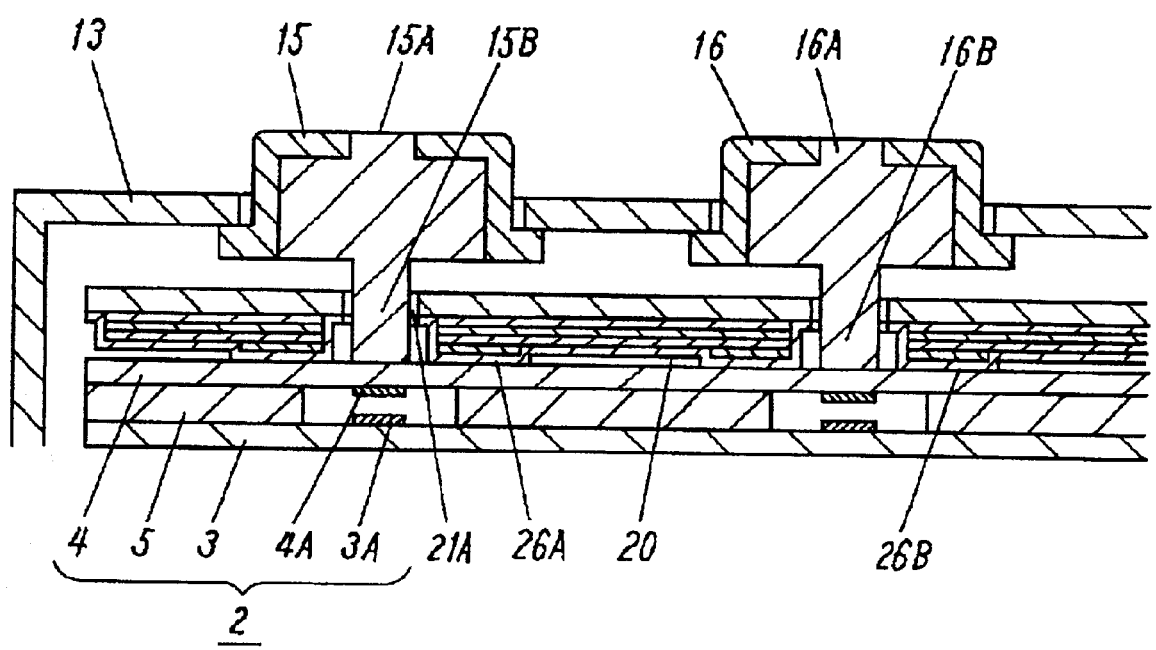
FIG. 2 is a cross sectional view of the illumination type keyboard according to the first embodiment.
Figure 3:
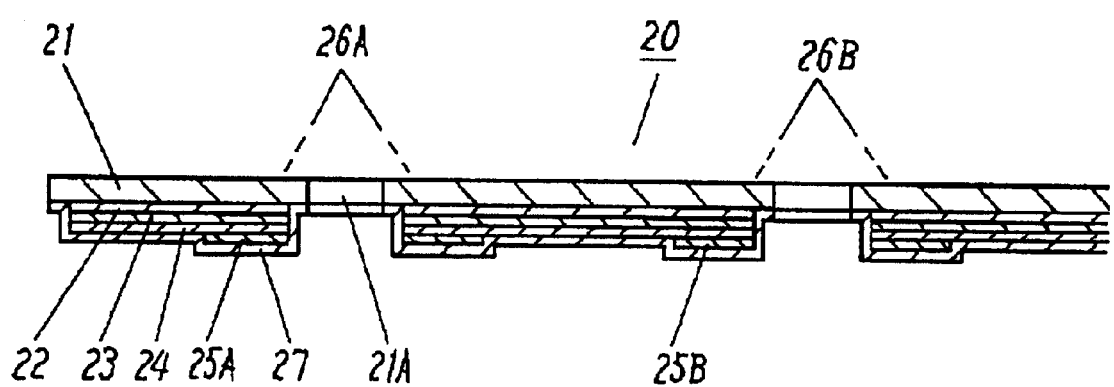
FIG. 3 is a cross sectional view of an electro-luminescence (EL) element in the illumination type keyboard according to the first embodiment.

FIG. 1 is a block diagram of an illumination type keyboard according to a first embodiment of the present invention, and FIG. 2 is a cross sectional view of it. FIG. 3 is a cross sectional view of an electro-luminescence (EL) element in the keyboard. Push buttons 15 and 16 made of insulating resin such as ABS, poly-carbonate, or acrylic resin in dark color have display heads 15A and 16A provided at respective tops thereof in semi-transparent or milky color and arranged of a character, symbol, or picture shape. A switching contact 2 below the push buttons 15 and 16 includes a circuit board 3, a flexible insulating film 4, and an insulating spacer 5 coated at both sides with an adhesive for bonding the board 3 and the film 4. The circuit board 3 has a fixed contact 3A on the upper side thereof as spaced by a distance from a movable contact 4A provided on the lower side of the insulating film 4, thus functioning as a membrane switch.

An electro-luminescence (EL) element 20 is provided beneath the push buttons 15 and 16. A substrate 21 of a light-transmissible film, glass, or resin includes a light-transmissible electrode layer 22 of light transmissible synthetic resin such as indium tin oxide provided on the lower side thereof by sputtering or electron beam method. The substrate 21 has plural apertures 21A provided therein for accepting downwardly-extending pressing portions 15B and 16B of the push buttons 15 and 16.

On the upper side of the light-transmissible electrode layer 22, a light emitting layer 23 made of highly-dielectric synthetic resin, e.g. fluorine rubber or cyano resin, with a light emitting material dispersed therein such as zinc sulfide, and a dielectric layer 24 made of highly-dielectric synthetic resin with barium titanate dispersed therein are formed by printing.

Separate back electrode layers 25A and 25B of silver or carbon resin are provided by printing on the dielectric layer 24 to face respective lower ends of the push buttons 15 and 16, respectively, thus providing separate light-emitting regions 26A and 26B. Those layers and the substrate 21 are covered with an insulating layer 27 made of epoxy or polyester resin.

The switching contact 2 and the EL element 20 are protected with a case 13 of insulating resin which has plural openings provided in the upper side thereof through which the push buttons 15 and 16 extend outwardly for upward and downward movement. As shown in FIG. 1, the switching contact 2 and the EL element 20 are coupled to a controller 28 including a microcomputer 28A, an inverter 28B, a switching element 28C, a voltage transformer circuit 28D, and a timer 28E.

When the push button 15 or 16 is pressed down, the pressing portion 15B or 16B urges from upper and deflects the insulating film 4 to make a direct contact between the movable contact 4A and the fixed contact 3A on the circuit board 3 for implementing an electrical switching operation.

A certain push button of the push buttons 15 and 16 is illuminated by the separate light-emitting regions 26A and 26B of the EL element 20 which is controlled by the controller 28 connected to the EL element 20 and the switching contact 2.

More specifically, the microcomputer 28A in the controller 28 controls the switching element 28C for the inverter 28B to apply a voltage between the light-transmissible electrode layer 22 of the EL element 20 and the separate back electrode layer 25A and 25B. This causes the light emitting layer 23 to emit light at the regions 26A and 26B between the two actuated electrodes, thus illuminating the push buttons 15 and 16 from below.

For example, when being energized with a voltage between the light-transmissible electrode layer 22 and the back electrode layer 25A by the inverter 28B, the light-emitting region 26A emits light to illuminate, from below, the display head 15A of the push-button 15. This enables an operator to clearly view the position of the push-button 15 and the character, symbol, or picture of the display head 15A even in a dim condition.

Similarly, when being energized with a voltage between the light-transmissible electrode layer 22 and the back electrode layer 25B, the light emitting region 26B emits light to illuminate, from below, the display head 16A of the push-button 16, which is thus identified clearly.

When being energized with a voltage between the light-transmissible electrode layer 22 and the separate back electrode layers 25A and 25B, all the light emitting regions 26A and 26B emit light to simultaneously illuminate all the push-buttons 15 and 16.

According to the present embodiment, the light emitting operation of the EL element 20 is controlled by the controller 28 for illuminating the certain button of the push-buttons. As a result, the illumination type keyboard for multiple push-button-illumination functions can be implemented by a simple arrangement.

In addition to the functions for illuminating the push buttons partially or entirely, the EL element 20 may be controlled for flashing the separate light emitting regions 26A and 26B by the microcomputer 28A of the controller 28 directing the timer 28E as a light-emitting-time controller to turn on and off the switching element 28C. Accordingly, this function can be used as an alarm indication; for example, when a battery of an electronic system having the keyboard is declined in power storage, the declination can be noticed to the operator.

The controller 28 may direct the switching elements 28C to turn on the separate light emitting regions 26A and 26B of the EL element 20 one after another, the push buttons 15 and 16 may be illuminated in a sequence during a given period of time. This function can be used for the operator to recognize connections to the power supply or an occurrence of a fault when the electronic system has been switched on or the fault has taken place. In addition to the previous function, the keyboard can offer another alarm function.

The microcomputer 28A of the controller 28 may direct the voltage transformer circuit 28D to change the voltage applied by the inverter 28B to the EL element 20, for switching respective luminances of the light emitting regions 26A and 26B. This allows the push-buttons to be illuminated at a proper brightness corresponding to an ambient brightness where the keyboard is used, and to be thus identified without error. Moreover, the brightness for illuminating the push-buttons may change between the case that the apparatus is connected to an AC power source and the case that it is connected to a DC battery. This enables the operator to be notified of the type of the power source. Accordingly, the keyboard can provide a further notifying function.

In case that the ambient condition is too bright, or that the keyboard has not been used for a long time, the EL element 20 may automatically be turned off by the controller 28 for reducing energy consumption.

Embodiment 2

In this embodiment, like components are denoted by like numerals as those of the first embodiment, and will be described in no more detail.

Figure 4:
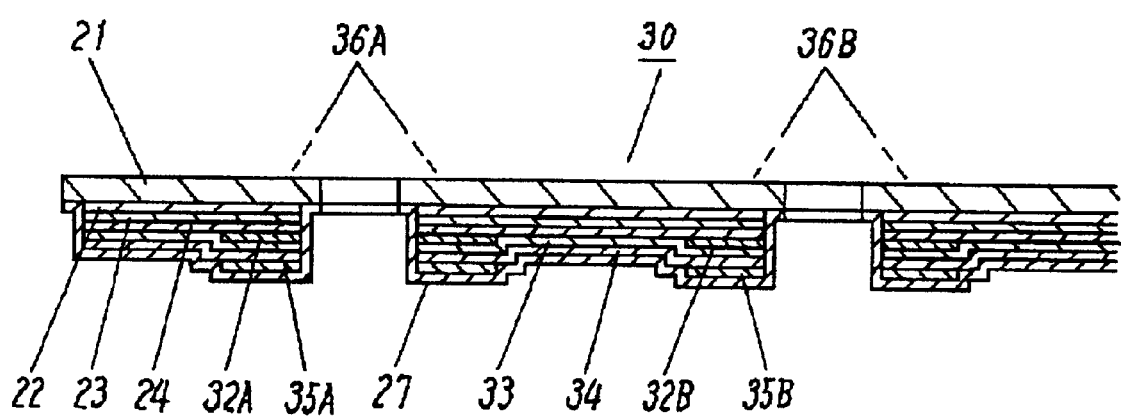
FIG. 4 is a cross sectional view of an EL element according to a second embodiment of the present invention.

FIG. 4 is a cross sectional view of an electroluminescence (EL) element according to a second embodiment of the present invention. Similar to the first embodiment, a light-transmissible electrode layer 22 is provided beneath a light-transmissible substrate 21, and a light-emitting layer 23 and a dielectric layer 24 are provided over the light-transmissible electrode layer 22 by printing.

Similarly to the first embodiment, separate intermediate electrode layers 32A and 32B are provided on the EL element by printing to face the push-buttons (not shown). The separate intermediate electrode layers 32A and 32B are made of light-transmissible synthetic resin with silver or carbon dispersed dispersed therein like the material of the light-transmissible electrode layer 22, thus having a light transmissible property.

Over the layers, by printing, a light emitting layer 33 having a different color from the light-emitting layer 23, a dielectric layer 34, and separate back electrode layers 35A and 35B, thus constituting separate light-emitting regions 36A and 36B. Those layers as well as an exposed surface of the substrate 21 are covered with an insulating layer 27 of epoxy or polyester resin.

The EL element 30, similarly to the first embodiment shown in FIGS. 1 and 2, is located along with a switching contact 2 beneath the push buttons, is protected with a case 13, and is connected to a controller 28.

When the EL element 30 is energized with a voltage between the light-transmissible electrode layer 22 and one of the separate intermediate electrode layers 32A and 32B by the controller 28, the light emitting layer 23 emits light at a desired region fed with the voltage to illuminate, from below, the push button in the same manner as of the first embodiment.

When the EL element 30 is energized at a desired region between the separate intermediate electrode layers 32a and 32B and the separate back electrode layers 35A and 35B, the light-emitting layer 33 emits light at the region to illuminate the push button in a color different from that of the light emitting layer 23.

The light emitting layer 23 may emit blue-green light while the light emitting layer 33 may emit orange light. When the EL element 30 is energized between the light-transmissible electrode layer 22 and the separate intermediate electrode layers 32A and 32B, the light emitting regions 36A and 36B illuminate the blue-green light from the light-emitting layer 23. When the EL element 30 is energized between the separate intermediate electrode layers 32A and 32B and the separate back electrode layers 35A and 35B, the light-emitting regions 36A and 36B illuminate the orange light from the light-emitting layer 33.

When being energized with a voltage between the light-transmissible electrode layer 22 and the separate intermediate electrode layers 32A and 32B and between the separate intermediate electrode layers 32A and 32B and the separate back electrode layers 35A and 35B, the two light-emitting layers 23 and 33 emit lights simultaneously at a desired region. More specifically, the light is emitted from the EL element 30 in a combination of the blue-green color and the orange color, thus appearing in a white color to illuminate a certain push button or all the push-buttons from below.

According to the embodiment, the EL element 30 emits light in different colors from the separate light emitting regions 36A and 36B, thus illuminating a certain push button in a color different from that of the other buttons. As a result, the illumination type keyboard of this embodiment can provide a variety of illumination functions.

As shown in FIG. 1, the switching contact 2 of this embodiment like the EL element can be connected to the controller 28. Accordingly, when a desired push button is depressed, the corresponding light-emitting region of the EL element 30 can be turned on by the controller 28 for illumination or flashing. This allows the push-button to be simultaneously illuminated at any desired group when being depressed for carrying out a particular function, hence contributing to the versatility of the illumination type keyboard.

Figure 5:
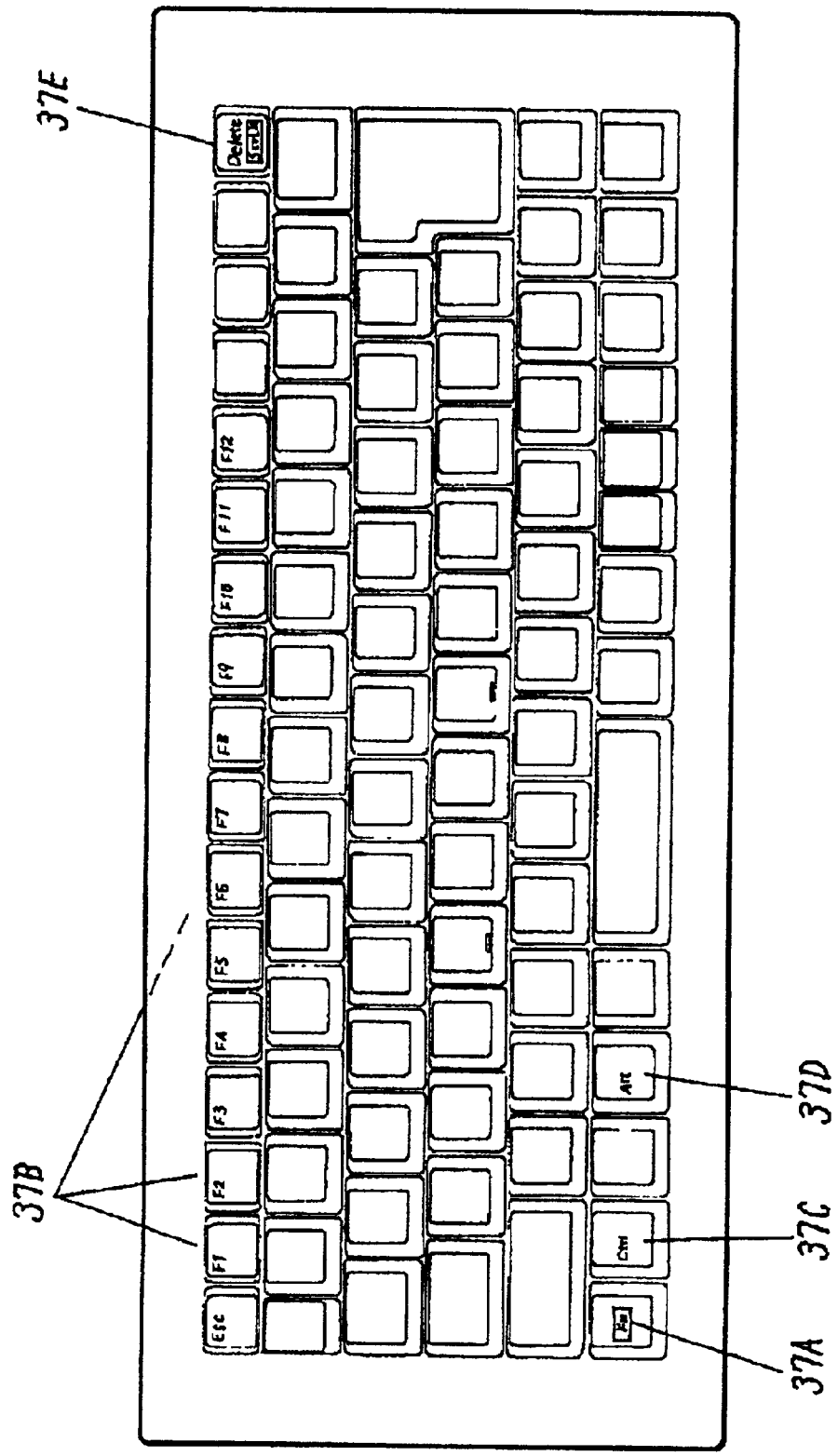
FIG. 5 is a plan view of an illumination type keyboard according to the second embodiment.
Figure 6:
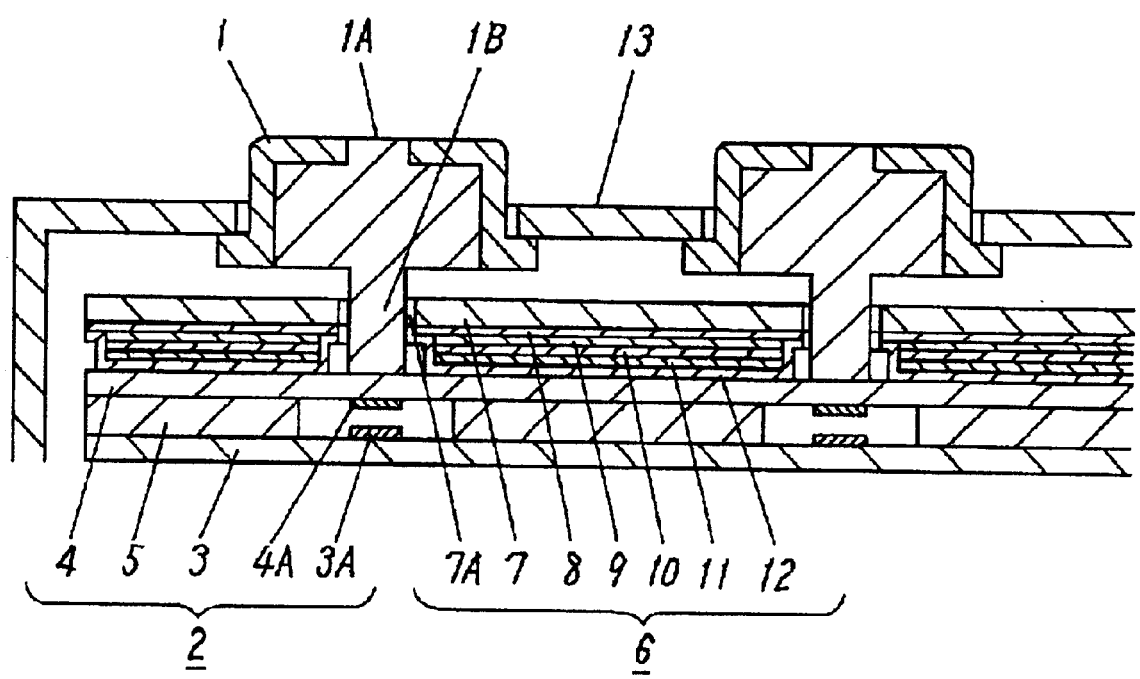
FIG. 6 is a cross sectional view of a conventional illumination type keyboard.

FIG. 5 is a plan view of the illumination type keyboard of this embodiment. When an Fn push-button 37A is pressed while all the buttons are illuminated in a blue-green color, a contact operation at the corresponding region of the switching contact 2 may be detected by the controller 28 to shift the illumination of an F1, F2, . . . buttons 37B to an orange color. Accordingly, the push button to be operated in response to the actuation of the Fn key 37A can easily be viewed and recognized by the operator.

Alternatively, when an fault occurs in an electronic system while all the buttons are illuminated in the blue-green color, a combination of a "Ctrl" button 37C, the illumination of an "Alt" button 37D, and a "Del" button 37E may be shifted from the blue-green color to the orange color. This permits the operator to conduct a reset operation at any emergency case without errors.

Similarly to the first embodiment, the operator can be notified of a remaining power of a battery or whether the electronic system is energized with an AC power source or a DC battery. While all the push buttons are illuminated in the blue-green color, a declination in the power of the battery may be notified by the illumination shifting from the blue-green color to a different color or the orange color. If the push buttons are illuminated in the blue-green color at the connection to the AC power source, their illumination may be shifted to the orange color when the connection to a DC battery is selected, thus contributing to the versatility of the illumination type keyboard.

Also, the illumination of the blue-green color on the push buttons may be in the orange color or changed to the white color and then to the orange color. In this manner, the illuminate can desirably be modified to correspond to multiple functions of the electronic system and the push buttons.

In the above description, the switching contact 2 is the membrane switch having the fixed contact 3A of the circuit board 3 and the movable contact 4A of the insulating film 4. The switching contact 2 may be operate between a fixed contact of a circuit board and a movable contact having a center domed made of an elastic metal sheet. The switch may be arranged between a movable contact and a fixed contact of rubber or elastomer of a domed shape or may be a push switch.

The voltage transformer 28D and the timer 28E of the controller 28 may be replaced by like components installed in the electronic system accompanied with the keyboard according to the embodiment. Alternatively, the controller 28 may be installed in the electronic system connected to the EL element 20 or 30 and the switching contact 2 of the keyboard.

What is claimed is:

1. A keyboard comprising:

a plurality of push buttons;

a plurality of switching contacts actuated by said push buttons, respectively, for making electrical connection and disconnection;

an electronic-luminescence (EL) element provided in a direction to said switching contact about said push buttons, said EL element including separate light-emitting regions for illuminating said push buttons, respectively; and a controller coupled to said EL element and said switching contacts, for controlling a light emitting operation of said EL element to illuminate a certain push button of said push buttons while illumination of another push button of said push buttons is prevented.

2. A keyboard according to claim 1, wherein said controller directs said separate light-emitting regions to emit lights simultaneously.

3. A keyboard according to claim 1, wherein said controller directs said separate light emitting regions to emit flashing lights simultaneously.

4. A keyboard according to claim 1, wherein said controller directs said separate light emitting regions to emit lights in a sequence.

5. A keyboard according to claim 1, wherein said controller stops said light emitting operation of said EL element when a predetermined length of time passes.

6. A keyboard according to claim 1, wherein said controller controls a voltage applied to said EL element to change respective brightnesses of said separate light-emitting regions.

7. A keyboard according to claim 1, wherein said controller directs said separate light-emitting regions to emit one of constant lights and flashing lights in response to an operation to a certain push button of said push buttons.

8. A keyboard according to claim 1, wherein said EL element emits light in different colors.

9. A keyboard according to claim 8, wherein said controller directs said separate light-emitting regions to emit lights simultaneously.

10. A keyboard according to claim 8, wherein said controller directs said separate light emitting regions to emit flashing lights simultaneously.

11. A keyboard according to claim 8, wherein said controller directs said separate light emitting regions to emit lights in a sequence.

12. A keyboard according to claim 8, wherein said controller stops said light emitting operation of said EL element when a predetermined length of time passes.

13. A keyboard according to claim 8, wherein said controller controls a voltage applied to said EL element to change respective brightnesses of said separate light-emitting regions.

14. A keyboard according to claim 8, wherein said controller directs said separate light emitting regions to emit one of constant lights and flashing lights in response to an operation to a certain push button of said push buttons.

* * * * *